US008559392B2

(12) United States Patent
Ramankutty et al.

(10) Patent No.: US 8,559,392 B2
(45) Date of Patent: Oct. 15, 2013

(54) INTER-TECHNOLOGY HANDOVERS FOR WIRELESS NETWORKS (75) Inventors: Rajesh Ramankutty, Nashua, NH (US); Sanil Kumar Puthiyandyil, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 12/847,699

(22) Filed: Jul. 30, 2010

(65) Prior Publication Data

US 2011/0051683 A1    Mar. 3, 2011

Related U.S. Application Data (60) Provisional application No. 61/230,031, filed on Jul. 30, 2009.

(51) Int. Cl.
*H04W 4/00* (2009.01)

(52) U.S. Cl.
USPC ............................................ 370/331; 455/436

(58) Field of Classification Search
USPC ......... 370/328–329, 331, 335–336, 338, 343, 370/345, 389, 392; 455/436–439, 442–444
See application file for complete search history.

(56) References Cited

U.S. PATENT DOCUMENTS

| 7,920,523 | B2 * | 4/2011 | Grinshpun et al. | 370/331 |
| 8,107,961 | B1 * | 1/2012 | Vargantwar et al. | 455/436 |
| 8,134,972 | B2 * | 3/2012 | Nakamura et al. | 370/331 |
| 8,218,512 | B2 * | 7/2012 | Yaqub | 370/338 |
| 2006/0209768 | A1 * | 9/2006 | Yan et al. | 370/338 |
| 2006/0245408 | A1 * | 11/2006 | Lee et al. | 370/338 |
| 2007/0189219 | A1 * | 8/2007 | Navali et al. | 370/331 |
| 2007/0189255 | A1 | 8/2007 | Navali et al. | |
| 2007/0254661 | A1 | 11/2007 | Chowdhury et al. | |
| 2008/0076419 | A1 * | 3/2008 | Khetawat et al. | 455/435.1 |
| 2008/0261596 | A1 * | 10/2008 | Khetawat et al. | 455/436 |
| 2009/0073936 | A1 | 3/2009 | Jentz et al. | |
| 2009/0080382 | A1 | 3/2009 | Chen et al. | |
| 2009/0305684 | A1 | 12/2009 | Jones et al. | |
| 2010/0002668 | A1 * | 1/2010 | Tan et al. | 370/338 |
| 2010/0008291 | A1 | 1/2010 | LeBlanc et al. | |
| 2010/0027448 | A1 * | 2/2010 | Puthiyandyil et al. | 370/310 |
| 2010/0041365 | A1 * | 2/2010 | Lott et al. | 455/406 |
| 2010/0041405 | A1 * | 2/2010 | Gallagher et al. | 455/436 |
| 2010/0077459 | A1 * | 3/2010 | Mahdi et al. | 726/4 |
| 2010/0091653 | A1 | 4/2010 | Koodli et al. | |
| 2010/0232407 | A1 * | 9/2010 | Navali et al. | 370/338 |
| 2011/0058531 | A1 * | 3/2011 | Jain et al. | 370/331 |
| 2012/0082111 | A1 * | 4/2012 | Tan et al. | 370/329 |

* cited by examiner

*Primary Examiner* — Kevin Mew
(74) *Attorney, Agent, or Firm* — Wilmer Cutler Pickering Hale and Dorr LLP (57) ABSTRACT

Systems and methods for improved inter-technology handovers between wireless networks are disclosed, in which a source radio access network operates on a first technology and a target radio access network operates on a second technology, and both radio access networks are managed at a single packet serving gateway. A foreign agent receives a mobile subscriber identifier during a handover of a mobile device from the source radio access network to the target radio access network and sends the mobile subscriber identifier to the packet serving gateway, and the packet serving gateway locates at least one process instance running on the packet serving gateway that is routing existing packet flows to the mobile device based on the mobile subscriber identifier. The packet serving gateway then transfers control of the at least one process to a control process.

20 Claims, 8 Drawing Sheets

FIG. 8

INTER-TECHNOLOGY HANDOVERS FOR WIRELESS NETWORKS

CROSS-REFERENCE TO RELATED APPLICATIONS

This application claims benefit of U.S. Provisional Patent Application No. 61/230,031, "Systems and Methods to Support a Handover Between Evolved High Rate Packet Data (eHRPD) and Long-Term Evolution (LTE)," filed Jul. 30, 2009, which is hereby incorporated by reference herein in its entirety.

TECHNICAL FIELD

The present disclosure relates generally to supporting mobile station handoffs in wireless networks which operate on different network technologies by transferring information to assist in the handoff.

BACKGROUND

In the field of wireless networking, modern mobile stations, such as cell phones or wireless broadband-equipped laptops, typically utilize a radio access network (RAN) to connect to a packet data network (PDN), by which they gain access to hosts on the Internet via Internet Protocol (IP). This connectivity is provided by mobile network operators, which build and maintain networks of radio access points, networking switches and gateways, and high-bandwidth links.

As a mobile station moves, such as from one radio tower to another radio tower, it can pass into areas of the network controlled by different equipment, such as a packet data serving node (PDSN), in some cases requiring a handoff. However, mobile network operators may have different technologies implemented on their networks, and not all equipment may be upgraded to the same technology at the same time. As a result, some handoffs take place that involve the mobile station being handed off to a radio network using a different radio network technology.

Two such radio network technologies are known as Long-Term Evolution (LTE) and Evolved High Rate Packet Data (eHRPD). The LTE standards are published by the $3^{rd}$ Generation Partnership Project ("3GPP"), a not-for-profit industry consortium. The eHRPD standards are published by a similar consortium called the $3^{rd}$ Generation Partnership Project 2 ("3GPP2").

OVERVIEW

Systems and methods for improved inter-technology handovers between wireless networks are disclosed, in which a gateway is connected over a first interface to a first wireless network on a first access technology and over a second interface to a second wireless network on a second access technology different from the first access technology. A mobile device handoff from the first wireless network to the second wireless network involves the prior transmission of a session identifier to an authentication server over the first interface and the reception of the session identifier during the handoff over the second interface. The session identifier is received by a session manager connected to the second interface, which causes an existing session instance configured to manage flows with the mobile device to be shared with the session manager.

DESCRIPTION OF EXAMPLE EMBODIMENTS

Systems and methods are provided for supporting inter-technology handoffs in wireless networks where a gateway is shared between the different network technologies. The inter-technology handoff can be provided to allow user equipment to seamlessly switch between legacy networks and current generation networks. This seamless inter-technology handoff functionality is provided by reusing information and configurations within the shared gateway. The information and configurations are stored by the shared gateway when the user equipment initiates a session with the network to, for example, make a call on the network. When an inter-technology handoff occurs at the gateway, the information and configurations used by the gateway functionality providing the session over the first network technology are then used by the gateway functionality providing the second network technology. Reusing information and configurations can avoid the need to reestablish the session when an inter-technology handoff occurs. Reestablishment of a session can otherwise be disruptive and can result in a dropped call or interruption of network-based content to the user equipment. In order to facilitate this reuse of information and configurations, this information can be associated with an identifier that can be used by the gateway functionality to gain access to this information. This identifier can be integrated into the attach procedure so that, when the mobile node attaches on a handoff, the information and configurations, if available, are provided to the functionality and session reestablishment is avoided.

An inter-technology handover occurs when a mobile device is capable of communicating using more than one standard radio access technology. Some examples of standard radio access technologies are Long-Term Evolution (LTE), Evolved High Rate Packet Data (eHRPD), Evolution-Data Optimized (EVDO), WiFi, and Worldwide Interoperability for Microwave Access (WiMAX). One of the wireless standards in the code division multiple access (CDMA) family of standards is referred to as high rate packet data (HRPD). The HRPD standard is generally incompatible with LTE, but to give mobile network operators an inexpensive network upgrade path, the 3GPP2 consortium has developed eHRPD, an offshoot of HRPD designed to share components with LTE. eHRPD networks share many components with LTE networks by design, including home subscriber servers (HSS), authentication, authentication, authorization and accounting (AAA) servers, packet data network gateways (PGWs), and policy and charging servers.

During a transfer between eHRPD and LTE, although the wireless access technology implementing the service may change, the following services may be implemented on the same network node across the transfer: the user equipment (UE); the PGW; the HSS and/or the AAA server; and the policy and charging rules function (PCRF). This may be leveraged in some embodiments. Other embodiments addressing handovers across technologies other than eHRPD and LTE where there are multiple services running on the same hardware are possible, as is information sharing for services other than those implemented on PGWs.

The underlying network protocol used by both eHRPD and LTE is Mobile IP, which uses the concept of IP tunneling. Mobile IP was introduced to allow a mobile station to keep the same IP address regardless of where the mobile station travels. When the mobile station is at home, it is on the home network, i.e., the network with which it is typically associated. The router connected to the home network is called the home agent. When the mobile station is away from the home network, it associates with a foreign network and communicates through a foreign agent. The foreign agent provides information to the home agent so the home agent knows the up-to-date location of the mobile node. If packets are sent to a mobile station, the packets first travel to the home network. If the mobile station is not residing in the home network, the packets are forwarded to the foreign agent with which the mobile station is registered, and then to the mobile station. In eHRPD, the home agent is called a mobility anchor. In both LTE and eHRPD the home agent is implemented at the PGW, while the foreign agent is implemented at a serving gateway (SGW) in LTE, and at an HRPD gateway serving node (HGSN) in eHRPD.

Often, the packets are forwarded via an IP tunnel, which may be established according to a tunneling protocol such as general packet radio service tunneling protocol (GTP) or Proxy Mobile IP (PMIP). An IP tunnel permits two network nodes to be connected via a virtual point-to-point connection. This is done by encapsulating a packet at one end for transport over an intermediate network, and de-encapsulating the packet at the other end. The PMIP protocol combines Mobile IP and IP tunneling to enable network-based mobility for the mobile station without modifications to the mobile station's TCP/IP stack. IP tunnels are common in Mobile IP implementations because Mobile IP uses the concept of a home agent and a foreign agent to manage mobility with different network endpoints; IP tunnels allow traffic to be sent conveniently and securely from a home agent to a foreign agent. These tunnels may be identified using generic routing encapsulation (GRE) keys or tunnel endpoint IDs (TEIDs).

These IP tunnels terminate at a packet-handling gateway such as a PGW, which is responsible for routing IP packet traffic from the core network to the mobile device via a RAN. A PGW may handle IP packet traffic using session managers and demux managers. Sessions are used to associate a UE with one or more packet flows, thus enabling IP connectivity; these sessions are associated with session managers, which manage packet flows to and from a network by allocating new sessions and tearing down unneeded sessions. Demux managers are services running on a gateway that monitor a network interface for packets and forward these packets to various destinations within a gateway based on characteristics of the packets. Demux managers may be implemented on a network interface using a network processing unit (NPU) residing on a gateway.

In certain embodiments, certain services may coexist on a single physical gateway that is capable of implementing both technologies. The above inter-technology handover may be implemented between a Proxy Mobile IPv6 (PMIPv6)-based S2a interface at an eHRPD-compliant packet data network gateway (PGW) and a general packet radio service tunneling protocol (GTP)-based S5/S8 interface at an LTE-compliant PGW. When these interfaces are implemented on the same gateway, the PMIPv6-based PGW and GTP-based PGW may be implemented as separate services on the same or closely interconnected hardware, with the separate services listening for connections at separate IP addresses or ports in some embodiments. Such an embodiment may implement separate subservices as well, such as demux managers and session managers, so that a PMIP call may be handled by a Home Agent subservice of the eHRPD-compliant PGW, while a GTP call may be handled by a demux manager subservice of a LTE-compliant Evolved GPRS Tunneling Protocol (eGTP) Manager.

However, inter-technology transfers may incorporate undesirable delays. For example, when an inter-technology handover occurs for a mobile node from an LTE network where it is connected via PMIP to a Local Mobility Anchor in an eHRPD network, the mobile node must authenticate itself on the new network and establish a connection to a HRPD serving gateway (HSGW), following which it may reestablish any connections or sessions on the new network. Such delays are undesirable particularly if they interfere with real-time IP services such as voice calls or streaming audio or video links. There is also potential for race conditions to occur; e.g. if teardown of the old network connection occurs before setup of the new network connection, packets may be dropped.

Such delays may occur even when one or more components providing the network are implemented as processes running on the same gateway. This is because the subservices which implement these processes are independent and sandboxed by protocol, so that they must query each other to obtain mobile subscriber identifiers such as international mobile subscriber identity (IMSI) and access point name (APN) in order to identify one or more session managers corresponding to that mobile subscriber and establish the transferring connection. Such queries may be expensive even if they do not result in accessing remote network resources.

To solve this problem, preexisting processes can be reused in an inter-technology handover, such as sessions which may exist in a session manager, or network processing unit (NPU) flows in a demux manager, by transferring session identifier information during the handover. Any session identifier that the PGW can use to locate a session manager instance will suffice, but as mobile subscriber identifiers such as GRE keys and TEIDs are readily available to the PGW and specifically tied to an IP tunnel associated with a mobile endpoint, the PGW may set the mobile subscriber identifier to be a session identifier.

In one representative embodiment of an inter-technology handoff, session reuse is enabled by piggybacking the aforementioned session identifier information onto the normal response of a HSS or AAA server. This information may be shared by transmitting it to a central network node, such as a a specially-aware HSS, that is shared by both technologies and that is consulted during the handover.

Figure 1:
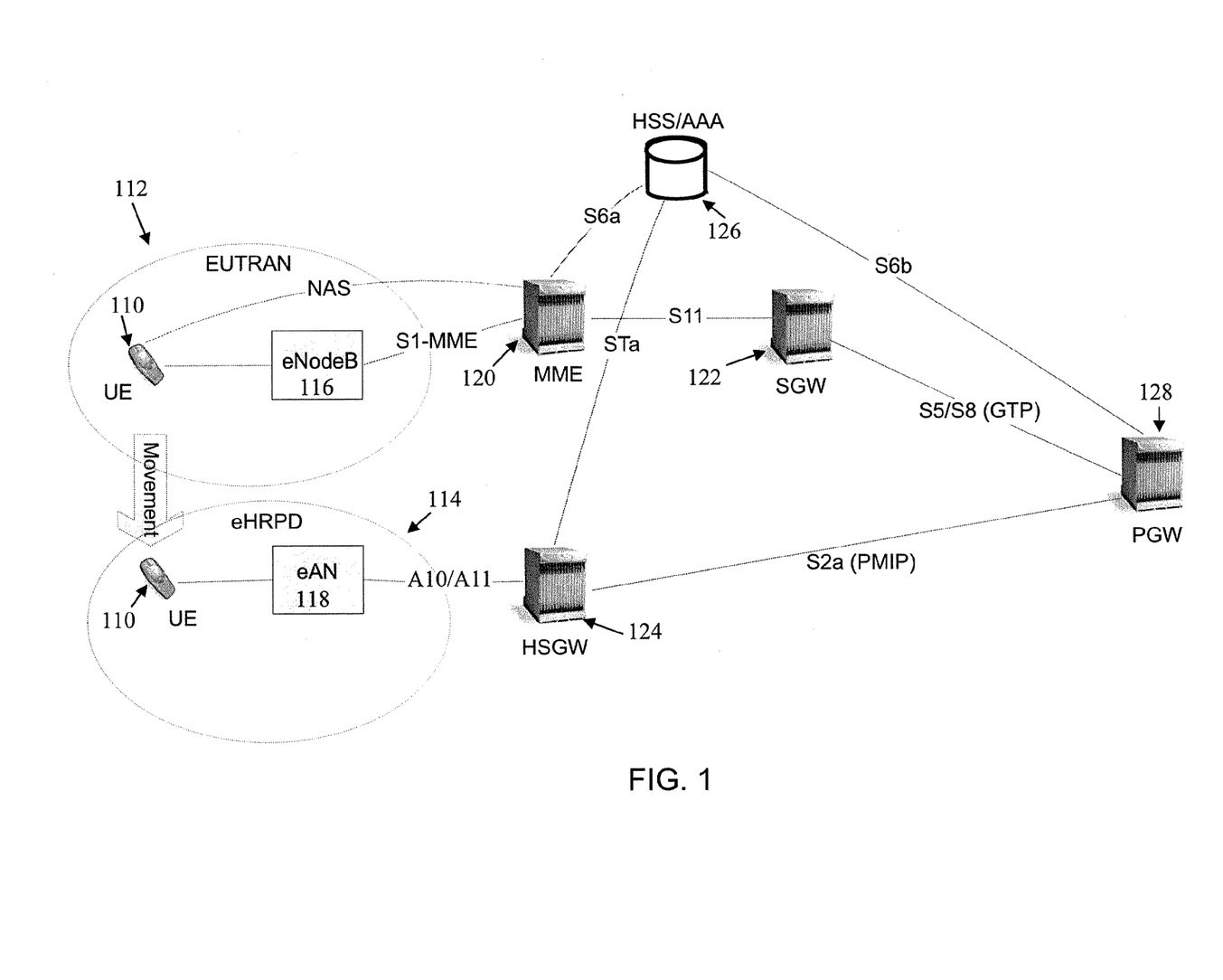
FIG. 1 is a schematic representation of a wireless data network and a typical inter-technology handoff of a mobile station.

FIG. 1 illustrates a wireless network 100 topology in accordance with certain embodiments. Wireless network 100 includes a mobile station (MS) 110, an EUTRAN wireless network 112, an eHRPD wireless network 114, an eNodeB 116, an evolved access node (eAN) 118, a mobility management unit (MME) 120, a serving gateway (SGW) 122, an HRPD serving gateway (HSGW) 124, a home subscriber server (HSS)/authentication, authorization, and accounting (AAA) server 126, and a packet data network gateway (PGW) 128. The illustrated network topology is specifically rendered in relation to a handoff from EUTRAN to eHRPD, with the source wireless network being the EUTRAN network 112 and the target wireless network being the eHRPD network 114. EUTRAN 112 is an implementation of an access network according to the specification defined for LTE by the 3GPP Project, and eNodeB 116 is an LTE implementation of a RAN. Likewise, eHRPD access network 114 and eAN 118 are implementations of an access network and a RAN as defined by the 3GPP2 Project. Each wireless networking technology differs in its arrangement and connectivity of nodes, and additional routers, servers, and other pieces of networking and communication equipment may also be included in wireless data network 100 depending on the specific wireless technology, as well as on the specific embodiment. Although two specific technologies are described here for clarity, the disclosure is not limited to these two technologies in this specific configuration.

EUTRAN 112, eNodeB 116, MME 10, SGW 122, and PGW 128 form a typical implementation of a LTE wireless network, in which the eNodeB is responsible for converting data into radio wave spectrum suitable for wireless transmission and converting received radio wave spectrum information into data, the MME is responsible for user equipment (UE) tracking and management, the SGW is responsible for routing and forwarding packets and for acting as a mobility anchor for the UE, and the PGW is responsible for policy enforcement and as a point of connection to other IP networks. EUTRAN 112 represents the wireless network served by eNodeB 116 using the EUTRAN air interface.

eHRPD network 114, eAN 118, HSGW 124, and PGW 128 form a typical implementation of a eHRPD wireless network, in which the eAN 118 corresponds roughly to an eNodeB 116 using the eHRPD, or equivalently, a 1xEV-DO air interface. The HSGW 124 in eHRPD serves the functions of both the MME 120 and the SGW 122 in LTE, thereby enabling routing, packet forwarding, and mobility anchor functions.

In some embodiments, such as in wireless network 100, two networks operating on different technologies are superimposed onto a single IP packet switched network. FIG. 1 only contains a single HSS/AAA server 126, which responds to authentication requests coming from both the LTE and eHRPD networks. This is possible because both LTE and eHRPD support the same basic authentication protocols. As well, the diagram only contains a single PGW. The problem of supporting both LTE and eHRPD networks is solved differently by providing two service instances in software on the physical hardware used to provide the PGW facility. One service instance handles traffic for the eHRPD network, and the other handles traffic for the LTE network. The PGW may be implemented on a chassis that can implement more than one technology.

In some embodiments, devices such as HSS/AAA 126 are responsible for the authentication, authorization, accounting, key distribution, policy dissemination, and other switching functionalities for wireless network 100. Wireless network 100 can also provide data transmission to a mobile station that is not located in its respective Home Network (not shown) by forwarding data from the outside Internet to a Home Agent, which then forwards this data to the mobile device. In LTE, this is accomplished using Proxy Mobile IP (PMIP), and in eHRPD by the use of Generic Routing and Encapsulation (GRE) tunnels. These two IP tunneling technologies are responsible for equivalently creating tunnels that allow outside IP packets to flow encapsulated through the PGW 128, to the SGW 122 in LTE and to the HSGW 124 in eHRPD, where they are de-encapsulated and continue on through RAN 112 or 114 to the mobile device 110.

Figure 2:
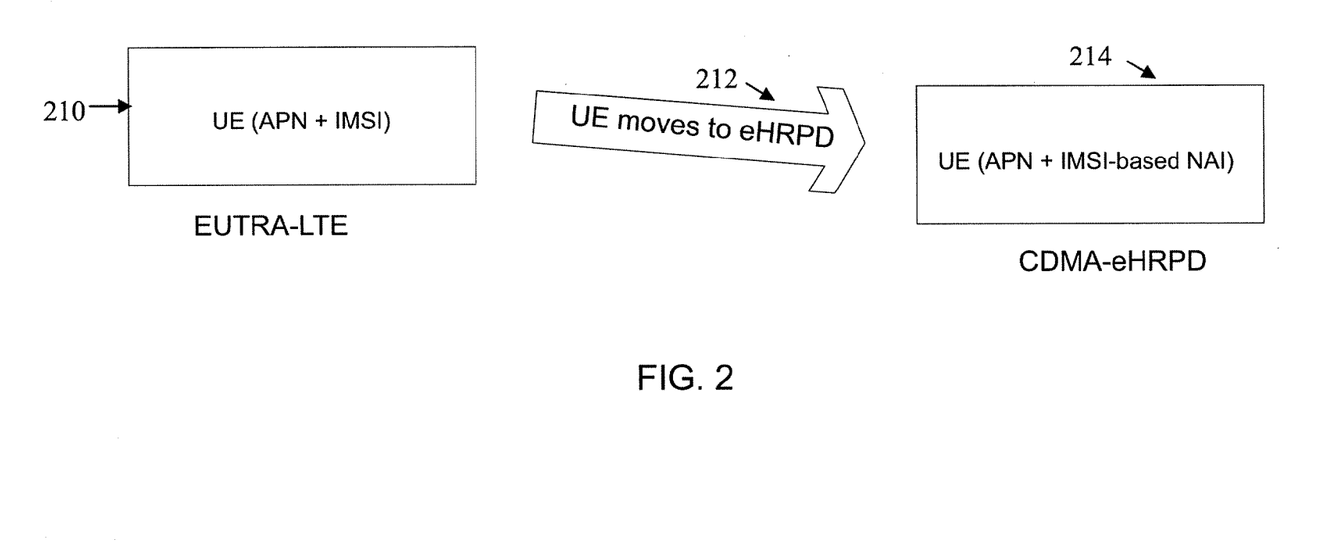
FIG. 2 is a block diagram of an inter-technology handoff and related subscriber information in accordance with certain embodiments.

FIG. 2 illustrates one aspect of the relationship between LTE and eHRPD in some embodiments. In 210-214, a mobile device, here called a user equipment (UE), moves between an LTE network and an eHRPD network. In 210, the mobile device is identified on the EUTRAN-LTE network by an access point name (APN) and an international mobile subscriber identity (IMSI). Subsequent to the handover in 212, the mobile device is identified on the eHRPD network at 214 by an APN and also a network access identifier (NAI), which is derived from the IMSI. In many embodiments, the APN and IMSI can thus be used in a simplistic fashion to uniquely identify the mobile subscriber; this is referred to below as the mobile subscriber identifier. However, this information is not identical across technologies, which is the reason a solution is necessary.

Figure 3:
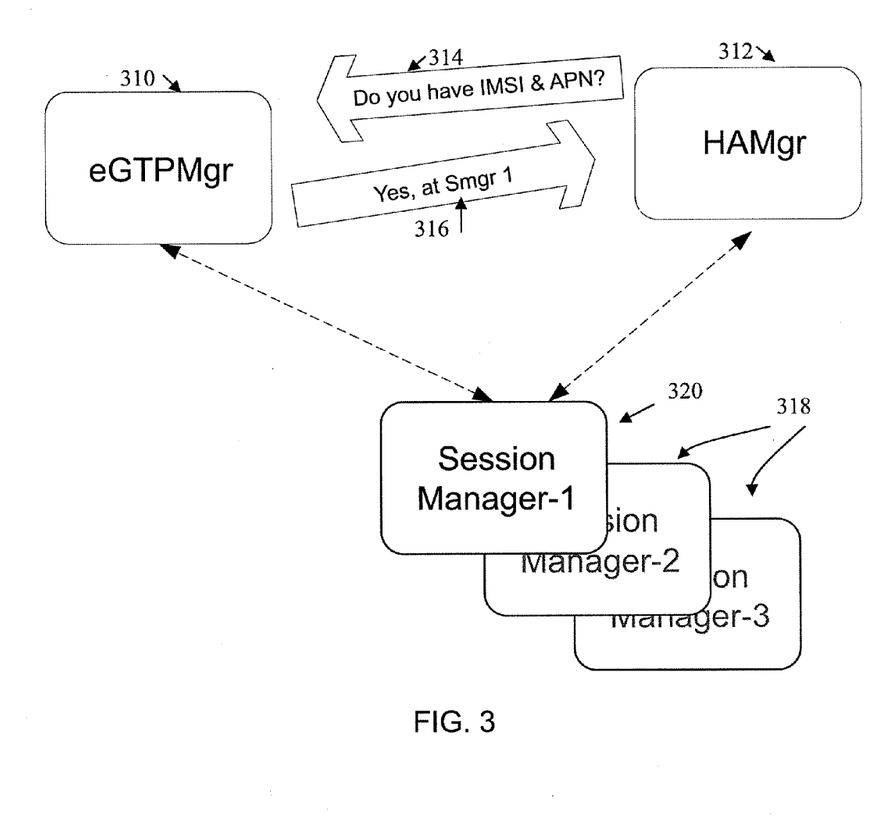
FIG. 3 is a block diagram of communication between services on a packet serving gateway in accordance with certain embodiments.

FIG. 3 illustrates how internal operation could be performed in a PGW. As described above, the PGW is a network node that is shared between LTE and eHRPD implementations, and the PGW offers the same services to both networks. In some embodiments, the network services offered to each network are implemented as separate daemons, processes or tasks on the same hardware. These processes may listen for TCP/IP connections on different ports, or a single service may listen on the same port and separate incoming messages for delivery to each individual process. The evolved generic tunneling protocol manager (eGTPMgr) 310 can be an implementation of such a process for eHRPD, and the home agent manager (HAMgr) 312 is an implementation of such a process for LTE. In some embodiments any or all of these processes may be implemented as demux managers. Session managers 318, 320 are processes or process instances that handle various functions pertaining to routing of IP flows from the MS to an external packet data network and vice versa, such as behaving as a home agent or mobility anchor, creating and tearing down PMIP or GTP tunnels, maintaining sessions with external network nodes, and applying quality of service (QoS) and charging functions. In some embodiments, one session manager may be used for every MS. A session manager may be an independent daemon or process, or it may exist as a subprocess of a demux manager.

Arrows 314 and 316 depict an approach in which HAMgr 312 queries eGTPMgr 310 in response to a handoff request from a UE at arrow 314. In this example, prior to the handoff request, eGTPMgr 310 is in communication with Session Manager 1 320, and the UE is being handed off from an eHRPD network to an LTE network, with the eGTPMgr 310 providing demux manager functionality for the eHRPD network and the HAMgr 312 providing demux manager functionality for the LTE network. The target network demux manager, HAMgr 312, makes a query to obtain the international mobile subscriber identity (IMSI) and access point name (APN) of the UE requesting the handoff from the source network. eGTPMgr sends an affirmative response back to the HAMgr in arrow 316 with the IMSI and APN, or with other information needed to take control of Session Manager 1. In response to the handoff request, HAMgr 312 obtains the necessary identifying information in arrow 316, resulting in HAMgr taking control of Session Manager 1. This method involves directly querying one demux manager from another demux manager.

Figure 4:
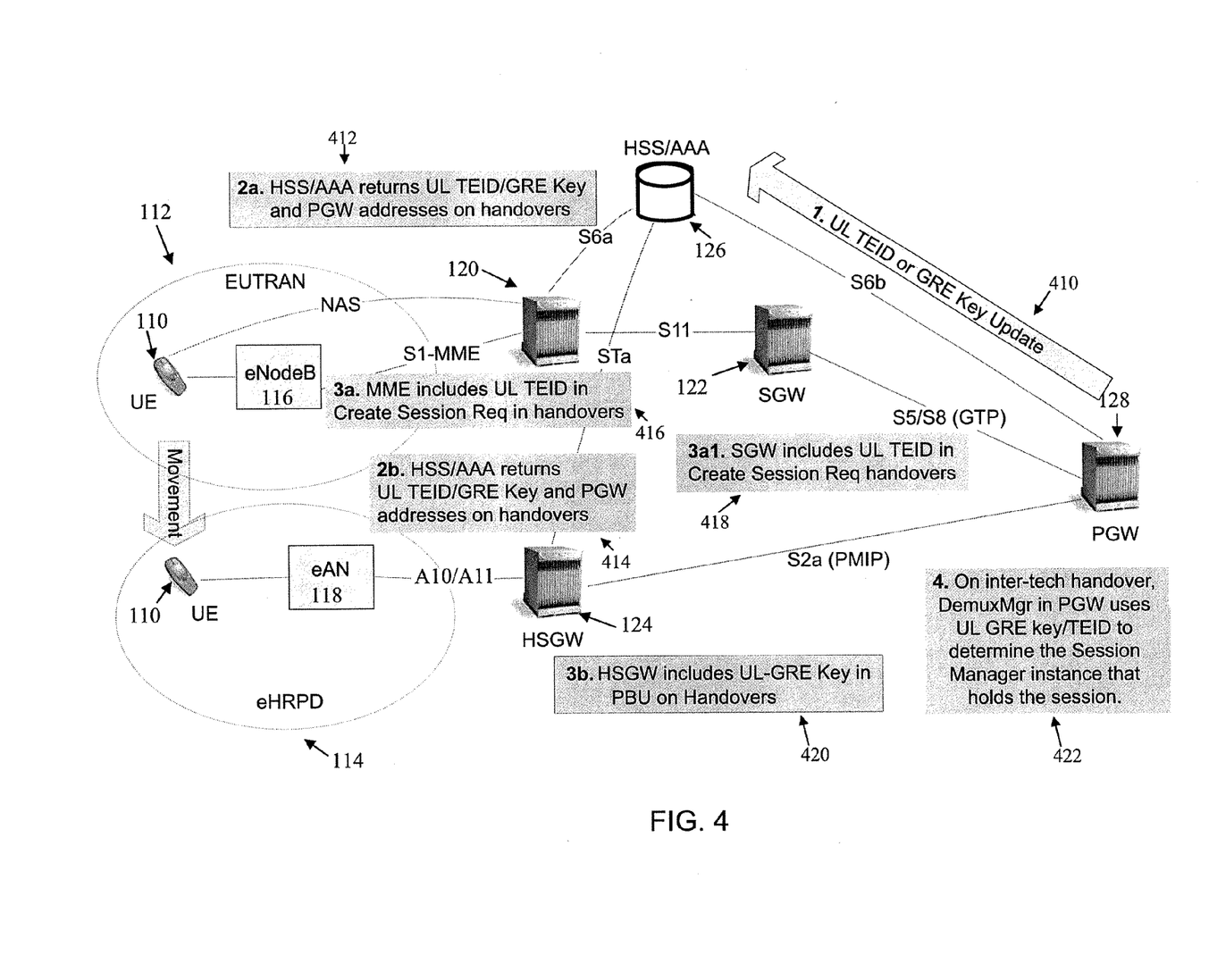
FIG. 4 is a schematic representation of a wireless data network and an inter-technology handoff indicating messages sent and received accordance with certain embodiments.
Figure 5:
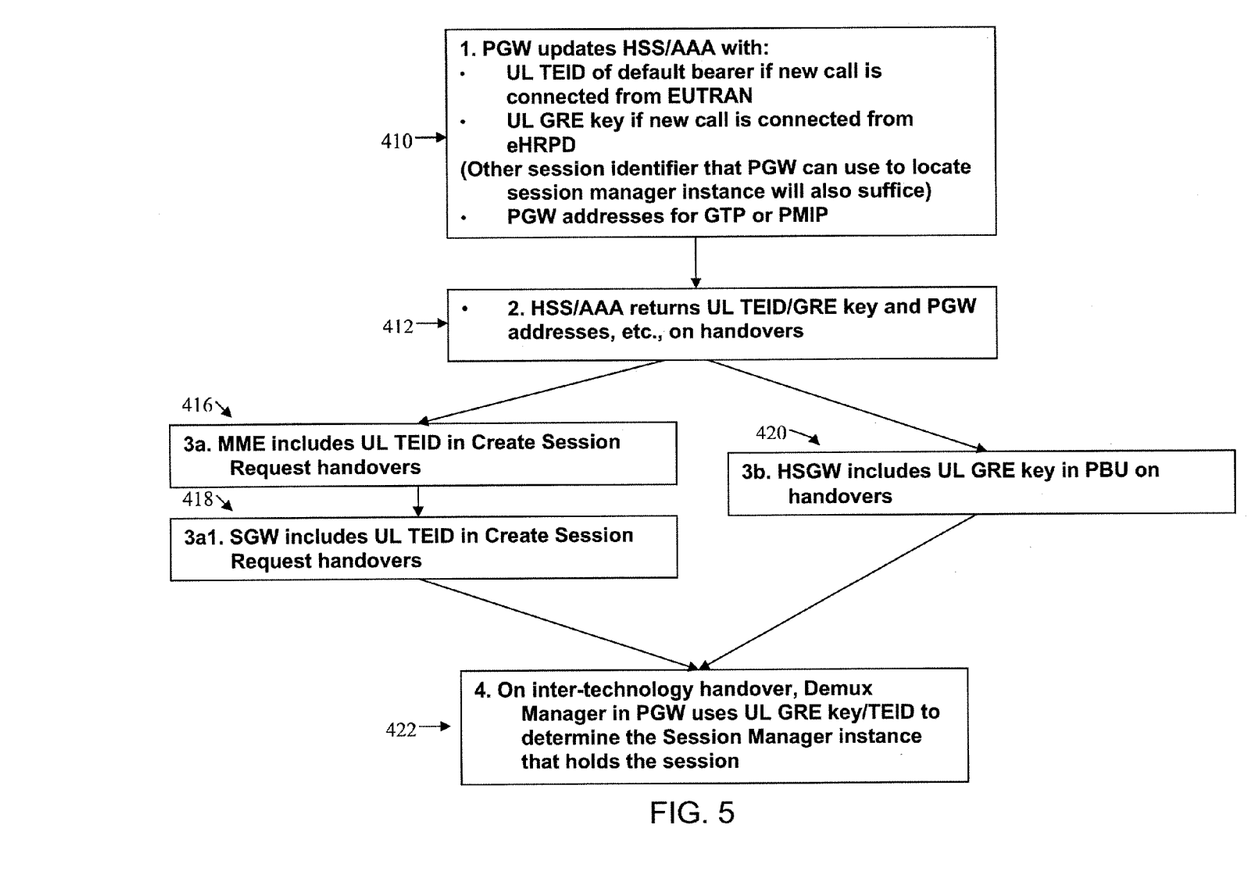
FIG. 5 is a flow diagram of four stages of the inter-technology handoff depicted in FIG. 4, in accordance with certain embodiments.

FIGS. 4 and 5 illustrates an inter-technology handoff in accordance with certain embodiments. FIG. 4 illustrates numbered steps 410-422 as appearing next to the network node they are executed by, and are numbered sequentially in order. FIG. 5 represents the identical steps as a flowchart. Specifically, an inter-technology handover from an LTE source network to an eHRPD target network is illustrated, in a configuration similar to the configuration of FIG. 1. MS 110 moves from EUTRAN 112 to eHRPD RAN 114, which involves MS 110 attaching to eAN 118 and HSGW 124 and detaching from eNodeB 116 and MME 120.

In 410, PGW 128 sends mobile subscriber identifier information to the HSS/AAA server 126. This may be done by a session manager, a demux manager, or by other services or modules within the gateway handling processing for the source network. This step takes place prior to the handoff on the source network, and is a precondition for reference number 412. This step may take place during or subsequent to an attach procedure in which the mobile node attaches to the source network and also to the PGW 128. When the source network is LTE, as shown here, the PGW may update the HSS/AAA with the uplink tunnel endpoint ID (UL-TEID) of the default bearer, or with the PGW addresses for GTP and PMIP, or with some combination of these. This identifier is stored at the HSS/AAA for later retrieval on handover. As this is not a standard part of the S6b protocol connection between the PGW and the HSS/AAA, vendor-specific extensions or other nonstandard modifications to the protocol may be used.

In 412/414, as part of the normal handover sequence, the HSS/AAA 126 is queried by the foreign agent on the target network. In the depicted EUTRAN-eHRPD handover, the target network foreign agent is the HSGW 124. At 412, as HSGW 124 queries HSS/AAA 126 for subscriber profile information and bearer setup information, the mobile subscriber identifier stored at reference number 410 at the HSS/AAA 126 is retrieved as well. This may utilize an augmented version of the S6a protocol, as specified above for step 410. Step 414 is omitted for clarity from FIG. 5.

Step 416 is the equivalent of step 412 in the case of an eHRPD-EUTRAN handover. In the eHRPD-EUTRAN handover, UL TEID information is transferred instead of GRE key and PGW address information. This is because eHRPD does not utilize GTP and therefore does not generate GRE keys. The mobile subscriber identifier may be of a different type than that specified here, particularly if a technology other than eHRPD or EUTRAN, or a tunneling protocol other than PMIP or GTP is used. Such identifiers may be based on international mobile subscriber identity (IMSI) or access point name (APN) as used in LTE, universal subscriber identification modules (USIM), network access identifiers (NAI) as used in CDMA, or on tunnel identification keys for IPv4 or IPv6 tunnels or PMIP/GTP tunnels, or other information.

Step 418 indicates that the UL TEID or other mobile subscriber identifier received from the HSS/AAA 126 is passed along by SGW 122 from MME 120 to PGW 128. As the S11/S5/S8 protocols may not expressly enable the transmission of this information, certain embodiments may require these protocols to be extended or augmented. In the case of EUTRAN-eHRPD handover, the mobile subscriber identifier is passed from the HSGW to the PGW in step 420. Following step 418 and/or step 420, the mobile subscriber identifier is at the PGW and has been received by the demux manager or session manager that handles processing for the target network. The demux manager or session manager handling processing for the source network has not been queried for the mobile subscriber identifier; instead, it has been passed to the target network demux manager via the HSS/AAA server.

Step 422 describes the processing that takes place at the PGW once the mobile subscriber identifier is received at the target network demux manager. As discussed above in paragraph 20, in some embodiments the PGW may host a demux manager for each radio access technology for which it provides packet data services. Each demux manager operates in conjunction with a session manager to handle incoming packet flows and route them to mobile devices or to the outside network. In some embodiments, the target network demux manager and/or session manager may be aware of the mobile subscriber identifier and may use the identifier to rapidly take over the active sessions, session instances and/or packet flows that are being handled by the source network demux manager.

Figure 6:
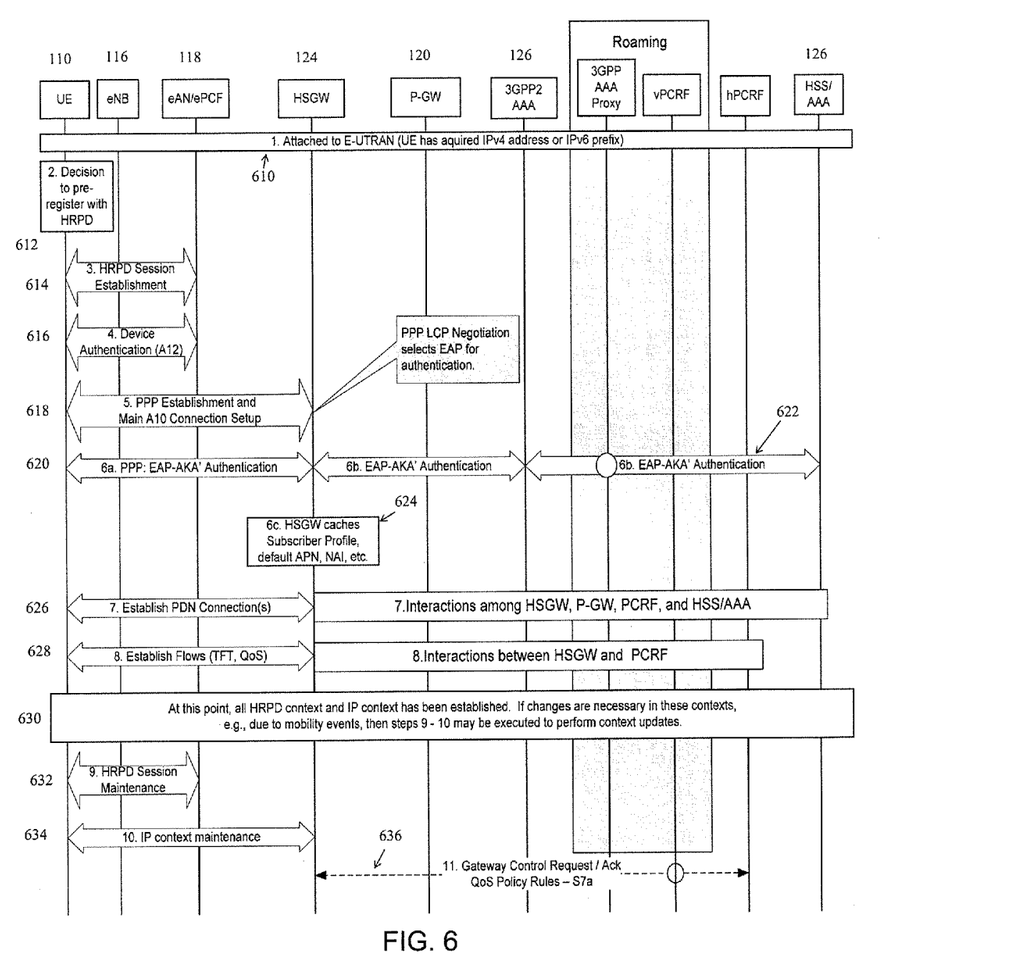
FIG. 6 is a signaling diagram of handoff signaling for a handoff of a mobile station from LTE to eHRPD in accordance with certain embodiments.

FIG. 6 is a signaling diagram for the LTE-eHRPD handover in accordance with some embodiments and as described above, with MS 110 (here labeled UE or User Equipment) detaching from eNodeB 116 and attaching to eAN 118. Box 610 reflects the preexisting session of the MS with the EUTRAN, including a PMIP tunnel with the SGW (not shown), which serves as mobility anchor/home agent in LTE networks. Through the SGW the MS has authenticated access to the LTE AAA server 126 and to external packet networks through PGW 120. Prior to the handover, the PGW has already sent subscriber identification information to the AAA server as described in 410 above. At 612 the MS 110 begins the process of initiating registration with the eHRPD network. This is done in a make-before-break fashion by sending a HRPD session establishment request 614 to the eAN 118. At this time the MS 110 sends mobile subscriber information such as the IMSI to authenticate the device to the eAN 118; this is shown in 616. This subscriber information is later passed along as the mobile subscriber identifier. The attach sequence continues with PPP session establishment from the MS to the HSGW in 618; from this point forward the HSGW serves as the mobility anchor for the MS on the target network.

In 620, mobile subscriber information and authentication information are sent from the MS 110 and HSGW 124 to the AAA server 126. The HSGW has a routable connection to the AAA server via the service provider's network and not via the packet data network, which it will establish a connection to later through the PGW. This is followed by authentication by the AAA server. In some embodiments, authentication may be done using extensible authentication protocol (EAP), EAP for UMTS authentication and key agreement (EAP-AKA), or an extension of EAP incorporating the mobile subscriber identifier, or another protocol. Authentication may include transmission of EAP-AKA' authentication information from the 3GPP2 AAA server to the HSS AAA server at step 124, and transmission of authentication keys to the HSGW. At this stage, the mobile subscriber identifier previously sent to the AAA server as described in 410 above is received at the HSGW; this is indicated at step 624. In some embodiments this may require an extension to the authentication protocol to carry this information. In some embodiments this may be done before, after, or at the same time as the transfer of subscriber profile information, which includes policy and QoS information that may be requested from a PCRF/QoS server in some embodiments.

At this point the MS 110 has a PPP connection to the HSGW 124; it then establishes a GTP tunnel connection through the PGW 120 to the remainder of the packet data network. This is shown in 626 as "Interactions among HSGW, P-GW, PCRF and HSS/AAA." Also occurring as part of 626, the mobile subscriber identifier is sent from the HSGW to the PGW as described above in 420. At the PGW, the mobile subscriber identifier is received by a demux manager, which converts the mobile subscriber identifier to a session identifier. The session identifier identifies a session that already exists at the PGW and is currently in use to route packets from the external packet data network to the MS 110. This is possible because eHRPD and LTE networks share the PGW; in other words the PGW serves as a home agent for the MS 110 in both the eHRPD and LTE networks.

In some embodiments, the mobile subscriber identifier is converted to a session identifier at the PGW 120 according to various potential techniques. In some embodiments the session identifier may be a process ID (PID); in others it may be an internal reference kept by the session manager in an internal table. In some embodiments session identifiers may be allocated from a limited address space that has a direct correspondence to a pool of mobile subscriber identifiers as listed in paragraph 36 above in the description of step 416; this may occur if the session identifier consists of the mobile subscriber identifier prefixed or suffixed by a constant bit string. In other embodiments, the correspondence may be reflected in an internal table.

At reference number 628, once the session identifier is determined, the session manager at the PGW 120 may perform any subsequent handover operations using the session currently allocated to route packet flows to MS 110 over the source EUTRAN radio access network 112. Since MS 110 has not yet broken its connection to EUTRAN 112, all packet flows currently in use by the user are continuing to flow through PGW 120 to EUTRAN 112, and PGW 120 may make use of these preestablished connections in completing the handover. The PGW does not need to perform handover operations with existing flows or sessions to another gateway, as is the case with an inter-technology handover to a technology that does not utilize a PGW as the mobile anchor/home agent. The PGW also does not need to establish another tunnel using PMIP or GTP, although it may establish one in some embodiments if needed by the mobile network operator's requirements. The PGW also does not need to perform handover operations to another process or session running on the same PGW to retain existing IP connections, as is the case with a standard EUTRAN-eHRPD handover or other inter-technology handover. This results in simpler and faster handover with less likelihood of dropped packets at the PGW. In some embodiments, the session management services running on the PGW may be implemented by a demux manager. In the case of the LTE-eHRPD handover, the eHRPD session management service takes over control of the process instance handling IP packet flows between the MS and the external packet data network using the session identifier.

At step 628, there is no need for any additional information to be retrieved from the PCRF because all packet flows have already been established on the EUTRAN 112 in accordance with the relevant policy rules. The HSGW 124 need only retrieve the relevant policy information from the PGW 128. It is still necessary to reestablish all packet flows from the PGW to the HSGW and from the HSGW to the MS 110.

Once the MS 110 has reestablished all packet flows with the PGW 128, all HRPD context and IP context has been established 630, and the connection to the EUTRAN 610 may be broken. If additional changes to the HRPD context or IP context are required they may be performed according to standard eHRPD protocols, e.g., HRPD session maintenance 632, IP context maintenance 634, and gateway control request/ack QoS policy rules S7a 636.

Figure 7:
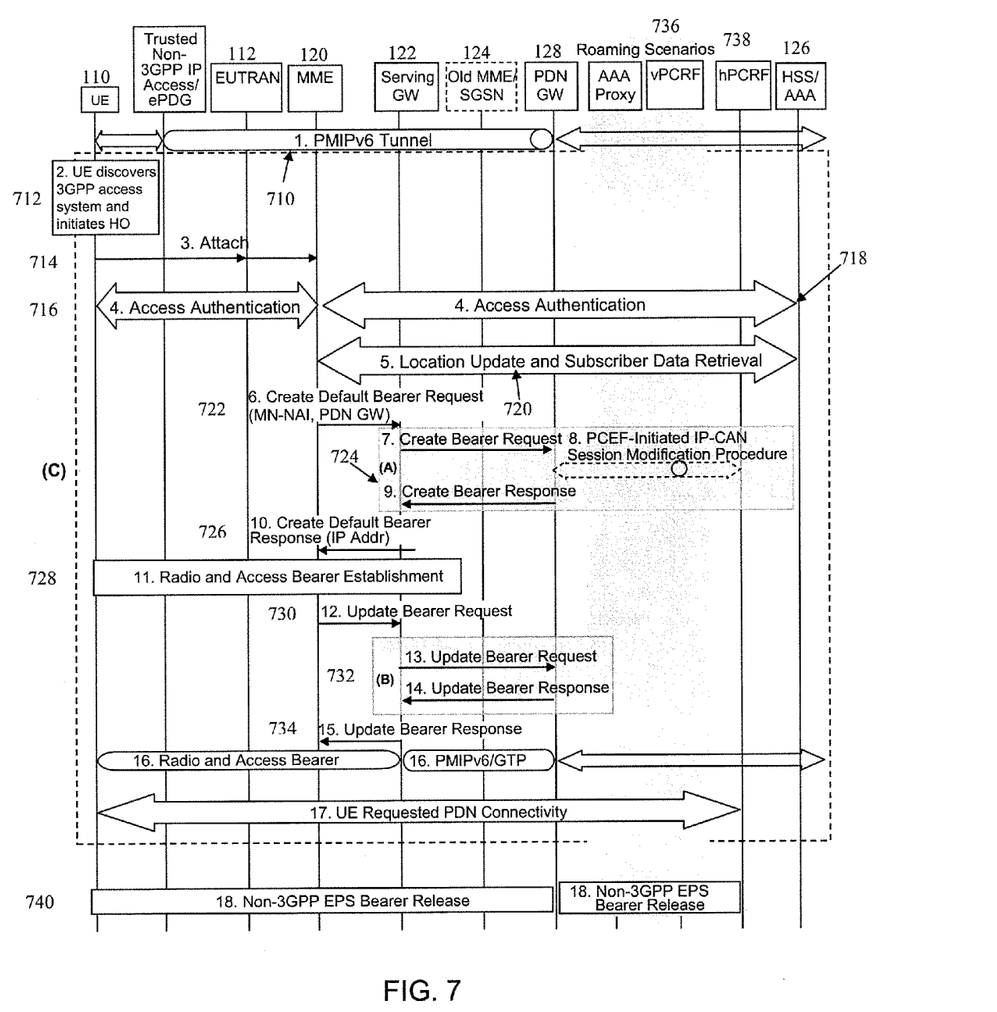
FIG. 7 is a signaling diagram of handoff signaling for a handoff of a mobile station from eHRPD to LTE in accordance with certain embodiments.

FIG. 7 is a signaling diagram for a eHRPD-LTE handover in accordance with some embodiments. The implementation of the eHRPD-LTE handover is very similar to the implementation of the LTE-eHRPD handover. Once again, the PGW 128 and HSS/AAA server 126 remain the same, and a single hardware device may implement both eHRPD and LTE handling. MS 110 begins at 710 on the eHRPD network, accessing the eHRPD radio access network directly via eAN 116 (not shown in FIG. 7) and accessing other packet data networks via a PMIPv6 tunnel In some embodiments PMIPv6 may be replaced with another tunneling protocol. At 712 the MS initiates a handover, and at 714 the MS sends an attach request to MME 120 via eNodeB 116 (not shown in FIG. 7) on EUTRAN 112 on the LTE network. At 716 the MME forwards authentication information from the MS to HSS/AAA server 126. At this time the MME sends a request for authentication/authorization to the HSS/AAA server at 716, received at 718.

The HSS/AAA server 126 has previously received a mobile subscriber identifier from the PGW 128, in 410 above (not shown in FIG. 7). At 720, once it receives an authentication request from the MME 120, the mobile subscriber identifier is forwarded to the MME. This may occur in tandem with the transmission of a subscriber profile, QoS or policy information. At 722, a request for an IP connectivity access network (IP-CAN) bearer, which provides IP services, is sent by the SGW 122 to the PGW 128, which results in a request 724 to the PGW to the visited policy control and charging rules function (vPCRF) 736 or home policy control and charging rules function (hPCRF) 738. The PCRF then initiates an IP-CAN session modification procedure. If the user has paid or can be billed for mobile network services), the PCRF acknowledges the request. At this stage the PGW is responsible for setting up the IP bearer.

In some embodiments, the PGW 128 sets up the IP bearer as follows. First the PGW converts the previously-received mobile subscriber identifier to a session identifier, and then the LTE session management service takes over control of the process instance handling IP packet flows between the MS and the external packet data network using the session identifier The session management service may be a demux manager in some embodiments. As the process instance is already using a PMIPv6 tunnel from step 710, it may either continue using PMIPv6 or establish another tunnel, e.g. GTP; this may differ based on the needs of the network operator in some environments. At the conclusion of 726, the MME receives an IP address and creates a bearer to enable IP connectivity for the MS. In some embodiments, no further action may be needed by the PGW to renegotiate or reestablish packet flows with the external packet data network. This concludes both radio and access bearer establishment, 728. Further updates may be enabled via update bearer request 730, update bearer request and response 732, and update bearer response 734, which establishes UE-requested PDN connectivity. At 740, non-3GPP EPS bearer release is performed.

In some embodiments, software needed for implementing a process includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. In some embodiments, an access gateway, a packet data serving node (PDSN), a foreign agent (FA), or home agent (HA) can be implemented on a chassis. Other types of devices can also be used in other embodiments to provide handoffs using the above-described method and protocol such as a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF).

In certain embodiments, one or more of the above-mentioned other types of devices are integrated together or provided by the same device. For example, an access network can be integrated with a PDSN and the fast handoff interface can be between access networks. The generic protocol message format including usage specific TLVs can be used with any gateway or access network. A gateway can include a PDSN, a FA, a HA, a PGW, a SGW, a MME, a GGSN, a PDIF, an ASNGW, a UPE, an IP Gateway, an access gateway, or any other applicable access interface device.

Figure 8:
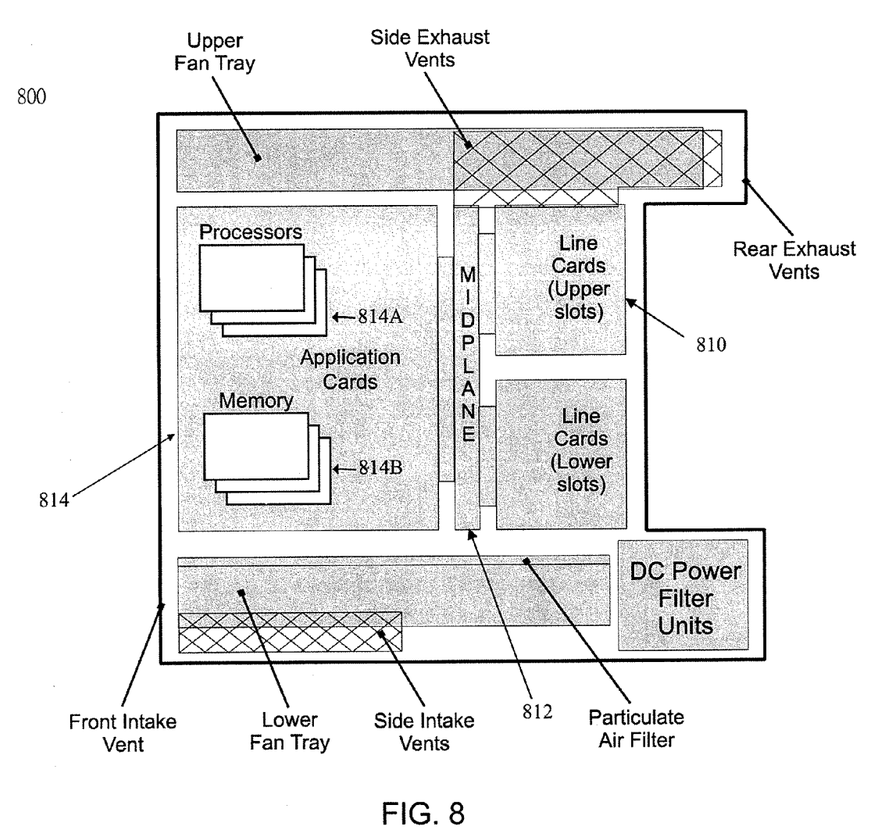
FIG. 8 illustrates a chassis in accordance with certain embodiments.

FIG. 8 illustrates a chassis 800 in accordance with certain embodiments. In some embodiments, a chassis can be used to implement many types of logical or functional devices such as a PDSN, GGSN, PDIF, ASNGW, FA, and HA. The chassis includes slots for loading application cards 810 including processor(s) 814A and memory 814B and line cards 810. A midplane 812 can be used to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the device implemented by establishing inter-card communications between application cards and line cards. The control bus interconnects the control and management processors within the device. The device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The device supports at least two types of application cards: a switch processor card and a packet accelerator card. The switch processor card serves as a controller of the device and is responsible for such things as initializing the device and loading software configurations onto other cards. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the device provide input/output connectivity and can also provide redundancy connections as well.

The operating system software can be based on a Linux software kernel and run specific applications such as monitoring tasks and providing protocol stacks. The software allows resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The software can be divided into a series of tasks that perform specific functions. These tasks communicate with each other as needed to share control and data information throughout the device. A task is a software process that performs a specific function related to system control or session processing. Three types of tasks exist in some embodiments: critical tasks, controller tasks, and manager tasks. The critical tasks control functions that relate to the device's ability to process calls such as initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on the device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the device by monitoring various software and hardware components. Recovery control task subsystem is responsible for executing a recovery action for failures that occur in the device and receives recovery actions from the high availability task subsystem. Shared configuration task subsystem provides the device with an ability to set, retrieve, and receive notification of configuration parameter changes and is responsible for storing configuration data for the applications. Resource management subsystem is responsible for assigning resources (e.g., processor and memory capabilities) to tasks and for monitoring the task's use of the resources.

A virtual private network (VPN) subsystem manages the administrative and operational aspects of VPN-related entities in the device, which include creating separate VPN contexts, starting IP services within a VPN context, managing IP pools and subscriber IP addresses, and distributing the IP flow information within a VPN context. In some embodiments, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A gateway comprising:
a first interface for communication with a first wireless network utilizing a first access technology;
a second interface for communication with a second wireless network utilizing a second access technology different from the first access technology;
a first session manager module in communication with the first interface, configured to provide a session identifier to an authentication server;
a second session manager module in communication with the second interface, configured to receive from the authentication server the session identifier in response to a mobile device handoff from the first wireless network to the second wireless network; and
a session instance identifier module in communication with the first and second session manager modules, the session instance identifier module configured to use the session identifier to manage packet flows directed to a mobile device that is shared between the first session manager and the second session manager.

2. The gateway of claim 1, wherein the first access technology is evolved universal mobile telecommunications system terrestrial radio access network (EUTRAN), the second access technology is evolved high rate packet data (eHRPD), and the gateway is a packet data network gateway.

3. The gateway of claim 1, wherein the first interface and the second interface are demux managers.

4. The gateway of claim 1, wherein the authentication server is an authentication, authorization and accounting (AAA) server.

5. The gateway of claim 1, wherein the session identifier is received from a high rate packet data (HRPD) serving gateway (HSGW) over a Proxy Mobile IP (PMIP) tunnel.

6. A method, comprising:
receiving an attach request at a gateway from a mobile device at a first functionality for communicating with a first wireless network using a first access technology;
establishing a session controlled by the first functionality at the gateway that routes packet flows to and from the mobile device;
performing a handover of the mobile device from the first functionality to a second functionality at the gateway, the second functionality for communicating with a second wireless network using a second access technology different from the first access technology;
receiving a mobile subscriber identifier at the second functionality from an authentication server during the handover without the second functionality querying the first functionality;
the second functionality locating the session at the gateway by using the mobile subscriber identifier; and
transferring control of the session at the gateway from the first functionality to the second functionality.

7. The method of claim 6, wherein the first access technology is evolved high rate packet data (eHRPD), the second access technology is evolved universal mobile telecommunications system terrestrial radio access network (EUTRAN), and the gateway is a packet data network gateway.

8. The method of claim 6, further comprising sending the mobile subscriber identifier to the authentication server from the gateway while the mobile device is attached to the first wireless network.

9. The method of claim 6, wherein the first functionality and the second functionality are implemented as demux managers.

10. The method of claim 6, wherein the authentication server is an authentication, authorization and accounting (AAA) server.

11. The method of claim 6, wherein the gateway communicates with the authentication server via the extensible authentication protocol (EAP).

12. The method of claim 6, wherein the mobile subscriber identifier is derived from an international mobile subscriber identity (IMSI).

13. The method of claim 6, further comprising transforming the mobile subscriber identifier into a session identifier.

14. The method of claim 6, wherein the mobile subscriber identifier is transformed into a session identifier using a table.

15. A system, comprising:
providing means for providing packet connectivity for a radio access network to external packet data networks for both a source radio access network operating on a first technology and a target radio access network operating on a second technology different from the first technology;
a first means for handling packet sessions for mobile devices associated with the source radio access network at the providing means;
a second means for handling packet sessions for mobile devices associated with the target radio access network at the providing means, the second means receiving a mobile subscriber identifier in response to a handoff of a mobile device from the source radio access network to the target radio access network;
processing means for processing packet flows directed to the mobile device; and
means for forwarding the mobile subscriber identifier from the target radio access network to the providing means;

wherein the providing means assigns control of the processing means from the first means to the second means using the mobile subscriber identifier.

16. The system of claim 15, wherein the providing means is a packet-handling gateway (PGW).

17. The system of claim 15, wherein the first technology is evolved high-rate packet data (eHRPD), and the second technology is evolved universal mobile telecommunications system terrestrial radio access network (EUTRAN).

18. The system of claim 15, wherein the first means and the second means are demux managers.

19. The system of claim 15, wherein the processing means is a session instance.

20. The system of claim 15, wherein the means for forwarding is an authentication, authorization and accounting (AAA) server.

* * * * *